3,379,701
COPOLYMERS OF ETHYLENE, ALPHA MONO-OLEFIN AND CYCLOPENTADIENE

Edward Karcher Gladding, New Castle, Del., and Herman Elbert Schroeder, Kennett Square, Pa., assignors to E. I. du Pont de Nemours and Company, Wilmington, Del., a corporation of Delaware
No Drawing. Filed May 22, 1963, Ser. No. 282,227
6 Claims. (Cl. 260—80.7)

This invention relates to new hydrocarbon interpolymers which may be readily sulfur-cured to give very useful elastomers.

$\alpha$-Monoolefins, such as ethylene and propylene, are very important polymer intermediates because they are commercially available in great volume at very low cost. It is known that they can be copolymerized to give products from which vulcanizates displaying outstanding elastomeric properties have been made. Unfortunately, these copolymers are not convenient to cure. Unlike natural rubber, styrene-butadiene rubber, or butyl rubber, they contain too little ethylenic unsaturation to permit a sulfur cure; thus, the sulfur curing procedures familiar to the trade cannot be used. Alternative methods for curing, such as the use of high energy radiation or the employment of organic peroxides, are more expensive and may limit the choice of antioxidants which can be incorporated in the uncured copolymer.

It has been found that unexpectedly high-quality, sulfur-cured elastomeric vulcanizates can be obtained from the improved copolymers of this invention which, briefly stated, are normally-solid, sulfur-curable copolymers of ethylene, a cyclic monomer having a single unsaturated ring of from about 5 to 10 ring carbon atoms, said ring having at least two double bonds therein, e.g., cyclopentadiene, and at least one $\alpha$-monoolefin of the formula $CH_2=CH-R$ wherein R is an alkyl group of from about 1 to 10 carbon atoms, said copolymers being capable of reacting with at least about 0.3 gram-moles of bromine per kilogram of copolymer in a $CCl_4$ solution at 25° C. over a 2-hour period.

Straight-chain $\alpha$-monoolefins are preferred, representative examples of which include propylene; 1-butene; 1-hexene; and 1-dodecene. Propylene and 1-butene are particularly preferred because they are low cost monomers available in quantity.

Representative examples of the copolymers within the scope of the present invention include:

ethylene/propylene/cyclopentadiene;
ethylene/1-butene/cyclopentadiene;
ethylene/propylene/1-butene/cyclopentadiene;
ethylene/1-hexene/cyclopentadiene; and
ethylene/1-butene/1-heptene/cyclopentadiene.

The higher the weight percent of cyclopentadiene in the copolymer, the more readily the latter can be sulfur cured. Since the cyclopentadiene costs more than the monoolefins, it is generally incorporated into the copolymer in the minimum proportions consistent with the desired degree of curability. It has been found that generally a practical degree of sulfur-curability is obtained for the many different monomer combinations possible when an amount of cyclopentadiene is present in the copolymer so that the uncured copolymer is capable of reacting with at least about 0.3 gram-mole of bromine per kilogram of copolymer in the dark in a carbon tetrachloride solution at 25° C. over a 2-hour period. The preferred diene unit concentration in the copolymer ranges from about 0.1 to 2 gram-moles per kilogram. This corresponds to about 0.66 to 13.2 weight percent of the copolymer. Higher proportions may be present, if desired, but are not needed for sulfur-curing. The most preferred products have between about 0.3 to 1 grammole of diene monomer units per kilogram of copolymer corresponding to about 2 to 6.6 weight percent of cyclopentadiene. The range of cyclopentadiene employed is generally defined at one end by the amount to enable a minimum practical cure, and at the other end by the amount to enable a high degree of cure and rapid curing speed without destroying elasticity.

Ethylene may be considered the basic building unit of the copolymer. Incorporation of units of one (or more) $\alpha$-monoolefins, $R-CH=CH_2$, serves to interrupt the sequences of chain methylene groups (which arise from the ethylene units) at frequent enough intervals to prevent an undesired degree of crystallinity of the type exhibited by polyethylene. While crystallinity is not generally desired, minor amounts thereof do not detract seriously from the rubberiness of the cured copolymer. Products with large amounts of crystallinity are not elastomeric at ordinary temperatures; they resemble polyethylene. On the other hand, long sequences of $\alpha$-monoolefin, $R-CH=CH_2$, units are to be generally avoided, since this too detracts from the elastomeric character of the vulcanizates, particularly at low temperatures when the $\alpha$-monoolefin is propylene. Consequently, it is desirable to have a certain amount of ethylene present to interrupt sequences of $R-CH=CH_2$ units. Between the extremes of too great a predominance of ethylene over the $\alpha$-monoolefin and vice versa, many monomer compositions are available which when copolymerized with cyclopentadiene are sulfur-curable to elastomeric vulcanizates.

An elastomeric vulcanizate having a particular proportion of cyclopentadiene component may contain a host of different proportions of ethylene and a particular $R-CH=CH_2$ monomer. The limits at which ethylene units can predominate over the units of the particular $R-CH=CH_2$ and vice versa can be established with some degree of certainty. These limits vary for each change in the monomer makeup of the copolymer, i.e., for each different $R-CH=CH_2$ monomer added in combination with or as a replacement for the particular $R-CH=CH_2$ monomer referred to above. These limits again change as the cyclopentadiene component is increased or decreased within the range permitted.

In terms of weight percent, good quality elastomeric vulcanizates are usually obtained when from about 20 to about 75% by weight of ethylene units are present in the copolymer, the remainder constituting the above-stated $\alpha$-monoolefin units and a sufficient amount of cyclopentadiene to impart sulfur-curability to the copolymer but not exceeding an amount to reduce elasticity below the limit defined below for the term "elastomeric."

The term "elastomer" and derivatives of said term are defined for the purpose of the present invention as "A substance that can be stretched at room temperature to at least twice its original length an, after having been stretched and the stress removed, returns with force to approximately its original length in a short time." This definition is set forth in ASTM Special Technical Publication No. 184, prepared by the ASTM Committee D–11 on Rubber and Rubber-Like Materials, published by the American Society for Testing Materials, 1916 Race Street, Philadelphia 3, Pa., August 1956. A further description and explanation pertaining to elastomers, rubber, and rubber-like materials is given in Chapter XI, especially on pp. 432–433 of Principles of Polymer Chemistry, P. J. Flory, Cornell University Press, Ithaca, N.Y., 1953.

Owing to the characteristics of cyclopentadiene it was rather surprising to find that the novel copolymers of the present invention can be prepared by contacting the above-described monomers in solution in inert solvents with coordination catalysts, as hereinafter described, at temperatures between about −30° C. and 100° C., at atmospheric, subatmospheric, or superatmospheric pressure; and, in the absence of catalyst poisons such as oxygen, water vapor, and carbon monoxide. The products obtained as a result of this process are normally solid high molecular weight copolymers capable of being sulfur-cured to form elastomeric vulcanizates.

When the copolymers made according to the foregoing process are sulfur cured, a satisfactory modulus is quickly attained. It should be understood that the novel copolymers of the present invention can be vulcanized by other curing agents, e.g., peroxides, but the use of sulfur-curing systems as customarily practiced by the rubber industry is much preferred.

The copolymers of this invention are prepared by the use of the familiar coordination catalyst system made by mixing vanadium compounds with organo metallic reducing compounds derived from aluminum. Illustrative vanadium compounds include vanadium tetrachloride, vanadium oxytrichloride, vanadium tris(acetylacetonate), vanadium oxybis (acetylacetate), triisopropyl orthovanadate, and tris(p-chlorophenyl)orthovanadate. The preferred types of aluminum compounds have the structures $R_3Al$ or $R_2AlX$ where R is $C_1$–$C_{12}$ alkyl and X is chlorine or bromine. The sesquihalide organo-aluminum compounds can be used also. Illustrative aluminum compounds include triisobutyl aluminum, diisobutyl aluminum chloride, and ethyl aluminum sesquihalide. The relative proportions of the vanadium salt and the organo-aluminum compound may be varied so that the value of the molar ratio of aluminum to vanadium ranges between about 1.5:1 to 30:1; preferably, from about 2:1 to 5:1. The preferred amount of the vanadium compound added to the copolymerization reaction zone is about 0.001 to 0.005 mole/liter; however, higher or lower amounts can be added. The catalyst may be premixed (usually in the presence of an inert organic liquid) or it may be formed in situ in the reaction zone.

A preferred solvent for preparing the copolymers in solution is tetrachloroethylene. Liquid paraffins and cycloparaffins such as neopentane, isopentane, pentane, cyclopentane, n-hexane, cyclohexane, n-heptane, 2,2,4-trimethylpentane, methylcyclohexane, and n-octane can be used. Another class of solvents includes liquid aromatic hydrocarbons and their chlorinated derivatives. Representative examples are benzene, toluene, cumene, mixed xylenes and chlorobenzene. Any of these solvents can be used as the "inert organic liquid" mentioned above.

In operating the copolymerization process, all of the monomers which are liquid under the process conditions may be present before the catalyst is added. Alternatively, all or part of these monomers may be added during the copolymerization; this introduction may be continuous or intermittent. Monomers which are gaseous under the process conditions, such as ethylene, are often added in a continuous manner for the entire duration of the polymerization; if desired, the reaction medium can be saturated with the monomer before the catalyst is added and the reaction is begun. The monomers are supplied at a rate equal to or greater than the rate of copolymer formation. The gaseous monomers can be purified by passage through scrubbers containing aluminum triisobutyl or molecular sieves type SA (commercially available from Union Carbide Corp.). Liquid monomers can be purified by fractional distillation.

In a typical procedure a glass reaction vessel, equipped with a glass agitator, gas inlet and outlet tubes and openings to permit the introduction of liquid reagents, is charged under nitrogen with tetrachloroethylene which has been purified by distillation from calcium hydride or by passage through a column of silica gel.

Agitation is started, nitrogen inflow is discontinued, and a mixture of ethylene and propylene gasses is continuously introduced through the gas inlet tube below the liquid surface. Thereafter any excess gas is allowed to escape through a bubble-trap filled with "Nujol," a liquid petrolatum of specific gravity 0.88–0.90 at 60° F. (available from Plough, Inc., Memphis, Tenn.), to prevent back-flow of air.

The relative amounts of ethylene and propylene in the gas feeed stream are controlled by suitably calibrated flowmeters which are placed in the gas feed lines ahead of the T in which the gases are mixed. Before they enter the reactor, the gases are freed from oxygen, water vapor and other contaminants reactable with aluminum triisobutyl by passage through a scrubber containing aluminum triisobutyl.

The ethylene-propylene mixture is introduced into the reactor for 3 to 5 minutes. Cyclopentadiene, aluminum triisobutyl, and vanadium oxytrichloride are then added, in turn, to the tetrachloroethylene solution of ethylene and propylene by means of hypodermic needles through an opening in the reactor sealed with a soft rubber serum cap. Typically, the amount of vanadium oxytrichloride added is such that the vanadium concentration in the reaction mixture is about 0.005 molar; the Al:V molar ratio is about 2:1; the diene concentration is about 0.03 molar. Reaction occurs at once and an intense blue-violet color appears. The monomers are consumed and the temperature of the charge rises. When desired, cooling may be applied. The concentration of copolymer reaches about 1 to 5 percent by weight in about 20 to 80 minutes when the temperature of the charge ranges between 20° and 60° C. As the copolymerization proceeds, the reaction mixture becomes increasingly viscous.

The use of ethylene as one of the co-monomers has several important effects. Fast reaction rates can be attained which are economically desirable for a manufacturing process. Copolymer products can be made having a molecular weight high enough (as indicated by an inherent viscosity of about 0.5 or more) to permit them to be compounded and fabricated on the machinery usually employed in the rubber industry.

The catalyst is deactivated by introduction of a low molecular weight alcohol to the reaction mass; representative reagents are isopropanol and n-butanol. The copolymer solution is then extracted with dilute hydrochloric acid, washed with water until acid-free, and introduced onto a hot rotating drum; the solvent is flashed off, leaving a band of copolymer which is subsequently scraped from the drum by a doctor knife; alternatively, the solvent may be evaporated and the copolymer subsequently dried by milling on a rubber roll mill. An antioxidant, such as 2,2′-methylene-bis-(6-tert-butyl-4-methylphenol) or 4,4′-thiobis(2-tert-butyl-5-methylphenol), is incorporated prior to the drying operation to avoid possible oxidation and degradation of the copolymer.

In operating the copolymerization porcess, in general, all of the cyclopentadiene may be present before the catalyst is added; alternatively, part or all of the cyclopentadiene may be added during the copolymerization; this introduction may be continuous, or, intermittent.

The copolymers of the present invention can be prepared in solution by a continuous process at atmospheric, superatmospheric pressure, or sub-atmospheric pressure; thus, solvent, monomers and catalyst may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased.

The reaction mixture which continually overflows from the polymerization zone is contacted in a subsequent zone with a catalyst deactivator; the copolymer is ultimately continually obtained after suitable continuous purification and isolation procedures. If desired, batch procedures can be used to deactivate, purify, or isolate the copolymer made in the continuous reactor.

The novel copolymers of this invention are generally rubber-like in character and may be cured with sulfur to form highly useful elastomers by a wide variety of curing procedures familiar to those skilled in the processing of natural rubber, butadiene-styrene rubber (SBR), and butyl rubber. It is preferable to use a combination of sulfur, a metal oxide, and a vulcanization accelerator. In general, about 0.2 to 2 parts of sulfur are used per 100 parts by weight of copolymer; it is to be understood that larger or smaller concentrations may be used when deemed desirable. Zinc oxide and cadmium oxide are the preferred metal oxides. At concentrations of 3 to 10 parts, preferably 5 parts, by weight per 100 parts by weight of copolymer the rate and state of cure are very satisfactory as indicated by modulus, compression set, and elongation. Concentrations above 10 parts are unnecessary. Concentrations below 3 parts are less satisfactory for developing and maintaining adequate vulcanizate properties. The most active accelerators include 2-mercaptobenzothiazoate, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercaptobenzothiazole and its derivatives, alone or in combination with thiurams or dithiocarbamates provide adequate acceleration with processing safety. Representative preferred accelerators include: tetramethyl thiuram monosulfide; tetramethylthiuram disulfide; and tellurium diethyldithiocarbamate. Other useful accelerators include: the zinc salt of dimethyl dithiocarbamic acid; the piperidine salt of pentamethylene dithiocarbamic acid; 2-mercaptothiazoline; 2-mercaptothiazole; N,N - diethyl-thiocarbamyl-2-mercaptobenzothiazole; and 2,2′-dithiobis benzothiazole. Typical accelerator concentrations range from about 0.5–2 parts by weight of copolymer.

Vulcanization is accomplished by heating the compounded stock. Typical temperatures range from about 140 to 170° C. The time needed will be lessened as the temperature is raised. Representative times range from about ½ hour to several hours. The state of cure can be determined by extension modulus at 300% elongation.

It is to be understood that the compositions of the present invention can be vulcanized by the use of sulfur-bearing compounds which make the sulfur available under curing conditions. As is well known to those skilled in the art, representative examples of these compounds have bridges containing two or more sulfur atoms, e.g., disulfide groups and tetrasulfide groups. Tetraalkylthiuram disulfides, e.g., tetramethylthiuram disulfide, tetraethyl thiuram disulfide, and dipentamethylene thiuram tetrasulfide, are valuable compounds of this type. Dithiocarbamates, such as selenium dimethyl dithiocarbamate and selenium diethyl dithiocarbamate and 4,4′-dithiodimorpholine are additional examples of useful compounds.

Further information is given in literature such as the following: Vanderbilt Rubber Handbook, R. T. Vanderbilt Company, 230 Park Avenue, New York, N.Y., 1958, pages 159, 172–173, 179, 240, 249; Chemistry of Natural and Synthetic Rubbers, H. L. Fisher, Reinhold Publishing Corp., New York, 1957, pages 30–31; The Applied Science of Rubber, pages 400, 1044–1048; Rubber, Fundamentals of Its Science and Technology, page 171; Synthetic Rubber Technology, pages 27–28, 240–241; Bulletin BL-316, Tetrone A, Elastomers Division, E. I. du Pont de Nemours and Company (Inc.), Wilmington 98, Del.; 1959 Catalogue of Du Pont Elastomers and Chemicals, Elastomer Chemicals Department, E. I. du Pont de Nemours and Co. (Inc.), Wilmington 98, Del., pages 34, 36 and 37.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Techology of Rubber, Davis and Blake, published by Reinhold Publishing Corp., New York, 1937, Chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099. Typical procedures are illustrated in the examples.

In place of sulfur curing, which is preferred, one may employ a free radical cure by introducing such free radical generators as bis($\alpha,\alpha$-dimethylbenzyl)peroxide, often called dicumyl peroxide, and 2,5-bis(tert-butylperoxide)-2,5-dimethylhexane and heating the compounded stock at about 150° C. for about 30–60 minutes.

In addition to the above-described curing additives, petroleum oils, conventional fillers and pigments may be added prior to cure. About 20 to 300, frequently 20 to 70 parts of carbon black are supplied for each 100 parts by weight of the copolymer in order to obtain vulcanizates of higher modulus and tensile strength. Channel and furnace process carbons are preferred for reinforcing the copolymer. Stocks containing the former filler are slightly slower curing. SAF carbon black is an excellent reinforcing agent. Thermal carbons can be used but provide a low order of reinforcement. Fillers other than carbon black can be used such as fine particle silicas, esterified silica, titanium dioxide, hard and soft kaolin clay, calcined kaolin clays, fine particle talc, and whiting. Any of the conventional fillers customarily employed by those skilled in the art for making caulking compositions can be introduced into the tacky low molecular weight members of the present invention in order to make highly useful caulking compositions.

The invention will now be described in and by the following examples of preferred embodiments thereof wherein parts and percentages are by weight unless otherwise specified.

EXAMPLE I (A) Preparation of cyclopentadiene

The cyclopentadiene monomer may be prepared by heating a 26.4-gram charge of dicyclopentadiene to its boiling point at atmospheric pressure in a 50-ml. vessel. The cyclopentadiene is slowly liberated and is distilled at 40–42.5° C. through a 3-foot packed column, operated at a reflux ratio of 5:1, and is collected in a flame-dried nitrogen-sparged receiver (cooled with crushed solid carbon dioxide) where it is stored for 30 minutes prior to use. The refractive index of the cyclopentadiene is about 1.4422 (measured at 22.3° C.).

(B) Preparation of ethylene/propylene/cyclopentadiene copolymer

A flame-dried 1-liter glass resin flask fitted with a glass paddle agitator, a thermometer, gas inlet and outlet tubes, and an opening to permit the introduction of liquid reagents is charged under nitrogen at room temperature (25° C.) with 497 ml. of silica gel-purified, nitrogen-sparged tetrachloroethylene and agitation was begun. A gaseous monomer mixture is then introduced through the gas inlet tube below the tetrachloroethylene surface to supply ethylene and propylene at the respective rates of 1000 cc./minute and 2200 cc./minute (molar proportions 1:2.2). Excess gas is allowed to escape through the gas outlet tube into a bubble-trap filled with a liquid petrolatum ("Nujol"). The relative amounts of the monomers in this feed stream are controlled by suitable calibrated flow meters which are placed in the individual monomer feed lines ahead of the tee in which the gases are mixed. Before it enters the resin flask, the gas mixture passes, in turn, through a column packed with silica gel, a column packed with sodium hydroxide supported on asbestos, two traps filled with triisobutyl aluminum, a trap filled with "Nujol" and a column packed with silica gel.

After the monomer gas mixture has been fed for about 5 minutes, flame-dried nitrogent-flushed syringes are used to introduce, in turn, 1.0 ml. (0.80 gram, 0.012 grammole) of cyclopentadiene, 0.5 ml. of a tetrachloroethylene solution 1.2 molar in vanadium oxytrichloride, and 1.2 ml. of a tetrachloroethylene solution 1.0 molar in triisobutyl aluminum into the resin flask. The cyclopentadiene concentration initially is 0.024 molar. After a few minutes, absorption of the monomer gas mixture stops and more triisobutyl aluminum and vanadium oxytrichloride are added until absorption of the monomer gas mixture occurs quite rapidly. A total of 6 ml. of triisobutyl aluminum and 1.5 ml. of the vanadium oxytrichloride solutions are introduced giving vanadium and aluminum concentrations in the reaction mixture of 0.0036 molar and 0.012 molar, respectively (corresponding to an aluminum to vanadium ratio of 3.3:1). The violet color of the reaction mixture changes to amber as the reaction proceeds and as more triisobutyl aluminum is added; however, it returns when vanadium oxytrichloride is introduced again. After the reaction has lasted for 55 minutes at about 25–30° C., 10 ml. of ethyl alcohol is introduced to deactivate the remaining catalyst. The copolymer solution is washed three times with about 500 ml. of 10% hydrochloric acid and twice with about 500 ml. of distilled water in a Waring Blendor. Concentration of the organic layer yields about 12.2 grams of a colorless rubber-like cocylymer containing about 37% by weight propylene propylene units and a maximum of about 6.6% cyclopentadiene units.

The presence of ethylene and α-monoolefin units in the copolymer, before curing, is indicated by infrared analysis in which strong absorption bands (transmit less than about 30% of the incident light) occur as follows: (a) at 7.25 microns, attributed to the terminal methyl group of the said α-monoolefin, (b) at 13.8 microns, attributed to sequences of —$CH_2$ groups. There is also an absorption at 6.1 microns attributed to the carbon-carbon double bond of the incorporated cyclopentadiene.

(C) Curing the copolymer

The copolymer prepared in Part B above is compounded on a rubber roll mill according to the following recipe:

| Component: | Parts by weight |
| --- | --- |
| Copolymer | 100 |
| SAF carbon black | 40 |
| Zinc oxide | 5 |
| Stearic acid | 1 |
| Tellurium diethyldithiocarbamate | 1.5 |
| Tetramethyl thiuram disulfide | 0.75 |
| Sulfur | 2.0 |
| N-phenyl-beta-naphthylamine | 1 |

The composition thus prepared is cured for 60 minutes at 150° C. The vulcanizate obtained displays superior physical properties of which the following are representative at 25° C.): modulus at 300% extension=480 lbs./sq. in.; tensile strength at the break=2160 lbs./sq. in.; extension at the break=760%.

EXAMPLE II (A) Preparation of cyclopentadiene

The cyclopentadiene monomer may be prepared by heating a 13.2-gram charge of dicyclopentadiene, mixed with 10 ml. of tetralin and 0.1 gram of hydroquinone, at 170° C. at atmospheric pressure. The cyclopentadiene liberated thereby is distilled through a 3-foot packed column and collected in a flask cooled by crushed carbon dioxide. About 7 grams of cyclopentadiene boiling at 40.5–41.0° C. (760 mm. Hg) are collected and kept cooled in crushed carbon dioxide until used.

(B) Preparation of ethylene/propylene/cyclopentadiene copolymer

Example I is repeated using the same apparatus and general procedure except as noted hereafter. A 980-ml. charge of tetrachloroethylene is placed in the resin flask, sparged with nitrogen, and saturated at 25° C. by introduction of ethylene and propylene at the respective rates of 1 and 2.3 liters per minute. While monomer gas inflow is continued at this rate, the reaction is begun by introduction, in turn, of 3.3 ml. (2.64 grams, 0.040-gram-mole) of cyclopentadiene, 10 ml. of 1 molar triisobutyl aluminum and 4 ml. of 1.2 molar vanadium oxytrichloride. In the reaction flask the initial concentration of cyclopentadiene is about 0.040 molar; the respective concentrations of aluminum and vanadium were 0.010 and 0.0048 molar, corresponding to a molar ratio of aluminum:vanadium=2.1:1). Very rapid absorption of monomer gases occurs and the temperature rises to about 45° C. Thereafter the temperature is allowed to fall toward room temperature. No external cooling applied during this reaction time. After about 50 minutes, the catalyst is deactivated by the addition of 20 ml. of n-butanol. Oxidation is safeguarded against by introduction of 0.01 gram of 2,2'-methylene-bis(6-tert-butyl-4-methylphenol). The green solution is washed three times with 500-ml. portions of 10% hydrochloric acid and once with 500 ml. of distilled water. Evaporation of the slovent and mill-drying of the residue [containing 0.02 gram of 4,4'-thiobis(2-tertbutyl-5-methylphenol)] yields about 18.1 grams of copolymer exhibiting the following typical properties: an intrinsic viscosity in tetrachloroethylene at 30° C. of 2.29 (89.8% of the copolymer being soluble); an iodine number of 14.5–14.6, corresponding to the reaction of one kilogram of copolymer with about 0.55 gram-mole of bromine; and an infrared absorption of 6.1 microns. Absorption bands at 11.0 and 11.3 microns are observed which are indicative of terminal unsaturated groups. Infrared analysis reveals that about 36.5% propylene units are present. The weight percent of cyclopentadiene is about 2.8% (calculated from the iodine number after correction for terminal unsaturation).

(C) Curing the copolymer

The copolymer prepared by the procedure of Part B above is cured according to the procedure of Part C of Example I. The vulcanizate obtained displays superior properties, of which the following are representative (at room temperature): modulus at 300% extension=630 lbs./sq. in.; tensile strength a break=2120 lbs./sq. in.; extension at the break=740%.

While in the above examples cyclopentadiene was used as the cyclic monomer, it is to be understood that other cyclic monomers within the scope of the definition may be used, e.g., 1,5-cyclooctadiene, with the result that desirable, sulfur-curable copolymers are obtained.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture and can be stored for lengthy periods before shaping and vulcanizing.

What is claimed is:

1. A random, amorphous, normally-solid, sulfur-curable copolymer containing from about 20 to 75 weight percent ethylene units, from about 0.1 to 2 gram-moles of cyclopentadiene units per kilogram of polymer, and the remainder being at least one α-monoolefin of the formula $CH_2$=CH—R wherein R is an alkyl group of from about 1 to 10 carbon atoms, said copolymer being capable of reacting with at least about 0.3 gram-mole of bromine per kilogram of copolymer in a $CCl_4$ solution at 25° C. over a 2-hour period.

2. A copolymer as defined in claim 1 containing from about 20 to 75 weight percent ethylene units, from about 0.3 to 1 gram-mole of cyclopentadiene units per kilogram of copolymer and the remainder being α-monoolefin units.

3. A random, amorphous, normally-solid, sulfur-curable copolymer of from about 20 to 75 weight percent ethylene, from about 0.3 to 1 gram-mole of cyclopentadiene per kilogram of copolymer and the remainder being propylene.

4. An elastomeric, sulfur-cured vulcanizate of the copolymer of claim 1.

5. An elastomeric, sulfur-cured vulcanizate of the copolymer of claim 3.

6. A process for preparing a random, amorphous, normally-solid copolymer of the monomers ethylene, propylene and cyclopentadiene which comprises contacting said monomers in a tetrachloroethylene solution at a temperature of from about −30° C. to 100° C. with a coordination catalyst system comprising triisobutyl aluminum and vanadium oxytrichloride, the molar ratio of aluminum to vanadium being from about 2:1 to 5:1, the amount of vanadium oxytrichloride added to the reaction zone being from about 0.001 to 0.005 mole per liter.

References Cited
UNITED STATES PATENTS

| | | | |
|---|---|---|---|
| 2,962,488 | 11/1960 | Horne | 260—85.3 |
| 3,000,866 | 9/1961 | Tarney | 260—80.5 |
| 3,260,708 | 7/1966 | Natta et al. | 260—79.5 |

OTHER REFERENCES

Chemical Abstracts, 60, Col. 10904h (1964).

JOSEPH L. SCHOFER, *Primary Examiner.*

S. LEVIN, W. HOOVER, *Assistant Examiners.*